United States Patent [19]
Hampton

[11] Patent Number: 6,116,303
[45] Date of Patent: Sep. 12, 2000

[54] APPARATUS AND METHOD FOR MAKING WOODWORKING JOINTS

[76] Inventor: R. Terry Hampton, 153 Noble St., Greenwood, Ind. 46142

[21] Appl. No.: 09/184,404

[22] Filed: Sep. 16, 1998

Related U.S. Application Data

[63] Continuation of application No. 08/842,498, Apr. 24, 1997, Pat. No. 5,832,977.

[51] Int. Cl.⁷ ................................. B27C 5/00; B27F 1/14
[52] U.S. Cl. .................. 144/144.51; 144/87; 144/144.1; 144/218; 144/372; 33/197; 409/130
[58] Field of Search ................................. 144/84, 85, 87, 144/137, 144.1, 144.51, 135.2, 136.6, 218, 240, 372; 409/110, 125, 130, 175, 181, 182, 132; 33/197, 199 R, 707

[56] References Cited

U.S. PATENT DOCUMENTS

| | | |
|---|---|---|
| 3,800,840 | 4/1974 | McCord, Jr. . |
| 3,834,435 | 9/1974 | McCord, Jr. . |
| 4,168,730 | 9/1979 | Keller . |
| 4,407,344 | 10/1983 | Dicke . |
| 4,428,408 | 1/1984 | Grisley ............................. 144/144.51 |
| 4,809,755 | 3/1989 | Pontikas . |
| 5,139,062 | 8/1992 | Keller . |
| 5,143,132 | 9/1992 | Keller . |
| 5,199,477 | 4/1993 | Keller . |
| 5,421,384 | 6/1995 | Nuwordu ........................... 144/144.51 |
| 5,423,357 | 6/1995 | Szymanski . |
| 5,692,861 | 12/1997 | Stottmann . |
| 5,832,977 | 11/1998 | Hampton ........................... 144/144.51 |

OTHER PUBLICATIONS

Leigh Industries, Ltd. catalog, "Leigh Woodworking Jigs and Accessories 1996", Port Coquitlam, B.C. Canada, 31 pages.

Porter–Cable Corporation, Porter–Cable catalog, "OMNIJIG Dovetail Machine Instruction Manual", Jackson, TN, 28 pgs., 1991.

Woodcraft Supply Corp. catalog, "Woodcraft", Parkersburg, WV, pp. 75 & 75, 1996.

*Primary Examiner*—W. Donald Bray
*Attorney, Agent, or Firm*—Woodard, Emhardt, Naughton, Moriarty & McNett

[57] ABSTRACT

A dovetail joint jig for guiding a power tool for creating a dovetail slot in a first workpiece and a dovetail pin in a second workpiece includes a substantially flat main body portion having a slot portion on one side and a pin portion on an opposite side. The slot portion includes a pair of oppositely-disposed side projections which define a clearance space therebetween. A tapered router bit is guided along the inner edge of the side projections in order to create a dovetail slot in the first workpiece. The pin portion includes a slot-shaped portion whose planar shape coincides with the shape of the slot to be created in the first workpiece and accordingly in the preferred embodiment coincides with the shape of the tapered router bit. A generally cylindrical router bit is guided around the edge of the pin portion in order to remove material from the second workpiece and leave a dovetail pin which matches the dovetail slot in the first workpiece. The dovetail joint jig includes a longitudinal centerline and the main body portion, slot portion, and pin portion are each symmetrical about that centerline. By establishing a common centerline for the slot portion and the pin portion, the machined dovetail slot and the machined dovetail pin in the two workpieces will always have a proper and accurate fit. Additional dovetail joint jigs can be assembled onto a common tooling fixture and the centerline alignment remains unaffected.

26 Claims, 9 Drawing Sheets

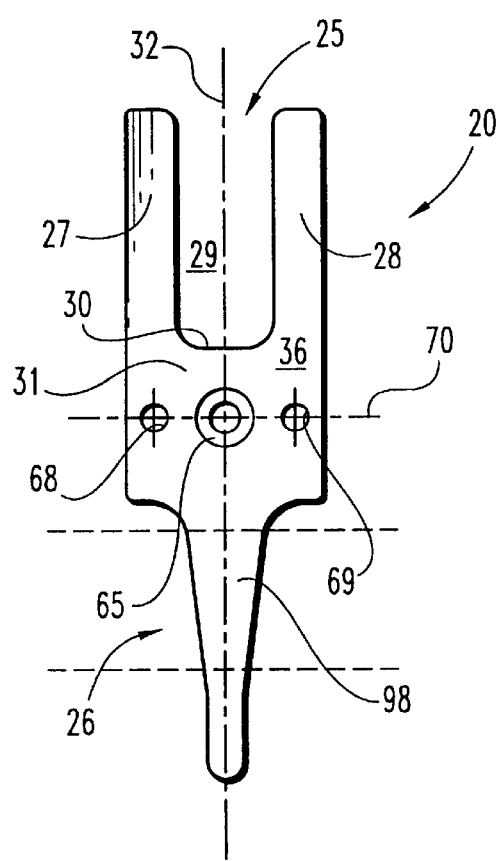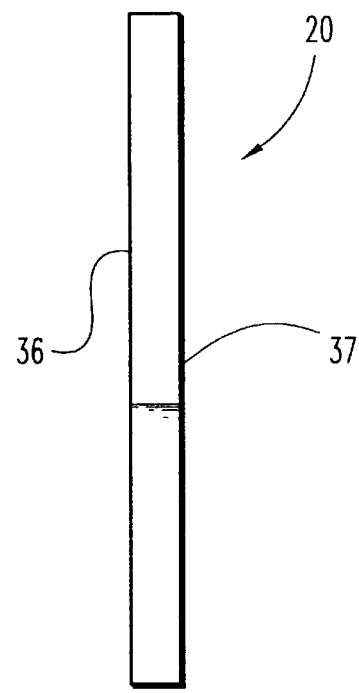
Fig.1  Fig.2

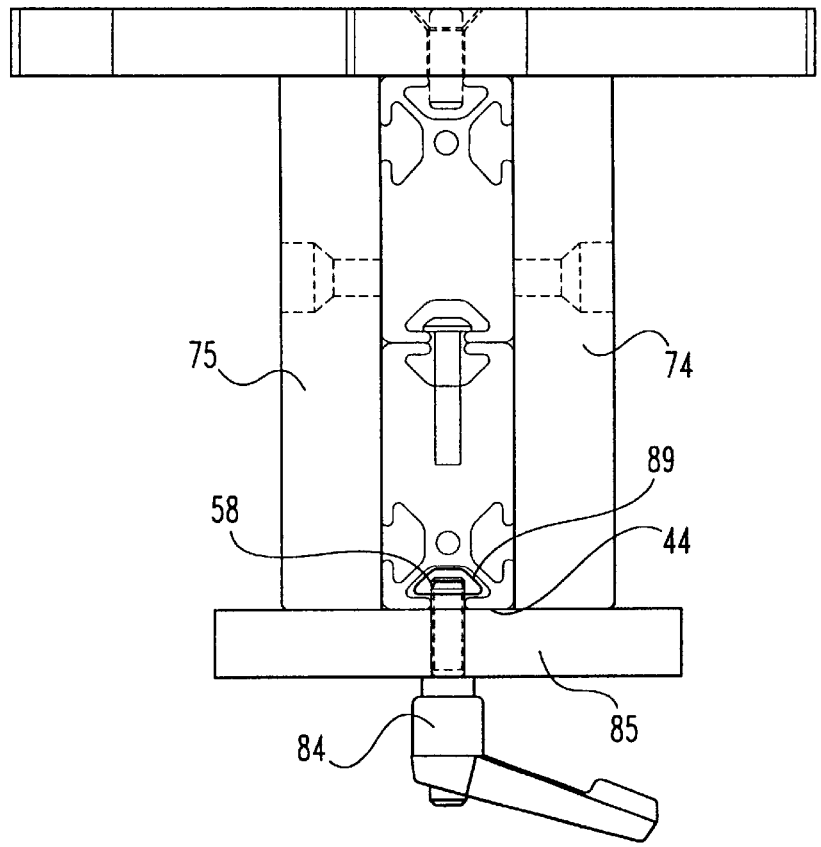
Fig. 7
Fig. 8  Fig. 9

APPARATUS AND METHOD FOR MAKING WOODWORKING JOINTS

This application is a continuation of 08/842,498, filed Apr. 24, 1997, and now U.S. Pat. No. 5,832,977.

BACKGROUND OF THE INVENTION

The present invention relates in general to apparata and methods for making woodworking joints. More specifically the present invention relates to the design of a machining guide and the arrangement of a plurality of such machining guides on a support member. Each machining guide is used to support and to guide a power tool which is used to machine two cooperating workpieces which are subsequently assembled to each other by means of one or more woodworking joints such as a dovetail joint.

One way to join together two interconnecting boards, such as when making a drawer or a piece of furniture, is to machine the cooperating portions of a dovetail joint and interlock the abutting edges of the two workpieces. A dovetail joint involves the creation of a "pin" in one workpiece and a receiving "slot" or socket in the other workpiece. If these two portions in each of the two workpieces are machined correctly, the pin fits snugly in the slot and the corner edges are able to be joined together with a smooth and flush corner joint. In the creation of furniture and drawers, a series of pins are typically created in one workpiece and a series of matching and cooperating slots are machined in the other workpiece. While dovetail joints are typically created in wooden workpieces, other materials may be used, so long as the material which is selected can be machined with the requisite degree of accuracy, by a suitable power tool such as a router.

Over the years a variety of jigs, templates, tooling arrangements and fixtures have been created for the purpose of trying to fashion dovetail pins and slots in cooperating workpieces. The following listing of U.S. patents is believed to provide a representative sampling of these earlier design efforts.

| PATENT NO. | PATENTEE | ISSUE DATE |
| --- | --- | --- |
| 5,143,132 | Keller | 9/01/92 |
| 5,139,062 | Keller | 8/18/92 |
| 4,168,730 | Keller | 9/25/79 |
| 4,428,408 | Grisley | 1/31/84 |
| 5,199,477 | Keller | 4/06/93 |
| 4,809,755 | Pontikas | 3/07/89 |
| 5,423,357 | Szymanski | 6/13/95 |
| 3,834,435 | McCord, Jr. | 9/10/74 |
| 4,407,344 | Dicke | 10/04/83 |
| 2,764,191 | Hartmann | 9/25/56 |
| 5,421,384 | Nuwordu | 6/06/95 |

One of the concerns with any type of machining fixture or jig is how easy or how difficult it is to use and how reliable are the results. Another concern is how much time does it take to use the device and are there too many non-productive or wasted steps. Cost is also a concern. While woodworking may be a profession to some, it is merely a hobby to thousands of others. In order to give these hobbyists the results expected by the professionals, the fixtures and jigs need to be easy to use and consistent in their results. The device should be such that a hobbyist will not feel overwhelmed by the number of steps required to achieve the desired result. If a tooling fixture or jig is too hard to use or too time consuming, a hobbyist, and conceivably even some professionals, may lose interest and opt to change to something a little easier.

Since a dovetail-style of woodworking joint is a secure and durable joint, there is a tendency to prefer this technique to the less desirable alternatives. Therefore, if a device can be provided which is easy to use, involves only a few steps, and gives uniform, predictable, accurate, and professional results to virtually anyone, there will be a significant advance in the art based upon the eleven patents listed above. The present invention provides such a device and the versatility which is afforded by the present invention enables hobbyists as well as professionals to create accurate and precise dovetail joints with an ease and simplicity not heretofore possible.

The present invention is able to achieve these novel and unobvious results by the design of a machining guide or finger which has a shape specifically selected in cooperation with router bit configurations used to machine the two workpieces. The "slot" in one workpiece or board is created at one end of the guide finger while the "pin" in the other board is left as a by-product of the machining based upon the configuration at the other end of the guide finger. In this manner, the size and spacing between different guide fingers can be varied and yet the final joint is still properly aligned, secure and precise.

SUMMARY OF THE INVENTION

A dovetail joint jig for guiding a power tool for creating a dovetail slot in a first workpiece and a dovetail pin in a second workpiece according to one embodiment of the present invention comprises a main body portion, a slot portion on one side of the main body portion, and a pin portion on an opposite side of the main body portion, the slot portion including a pair of oppositely-disposed side projections which define a clearance space therebetween and the pin portion including a slot-shaped portion whose planar shape coincides with the shape of the slot to be created in the first workpiece, the dovetail joint jig being constructed and arranged with a longitudinal centerline wherein the main body portion, the slot portion, and the pin portion are each constructed and arranged so as to be symmetrical about the longitudinal centerline wherein the first workpiece is positioned relative to the dovetail joint jig such that an end of the first workpiece is visible through the clearance space and wherein the second workpiece is positioned relative to the dovetail joint jig such that an end of the second workpiece is disposed beneath the slot-shaped portion.

One object of the present invention is to provide an improved dovetail joint jig for guiding a power tool.

Related objects and advantages of the present invention will be apparent from the following description.

BRIEF DESCRIPTION OF THE DRAWINGS

FIG. 1 is a top plan view of a dovetail joint jig according to a typical embodiment of the present invention.

FIG. 2 is a side elevational view of the FIG. 1 dovetail joint jig.

FIG. 7 is an enlarged, diagrammatic end elevational view of the FIG. 5 assembly.

FIG. 8 is a front elevational view of a cylindrical router bit.

FIG. 9 is a front elevational view of a tapered router bit.

DESCRIPTION OF THE PREFERRED EMBODIMENT

Figure 3:
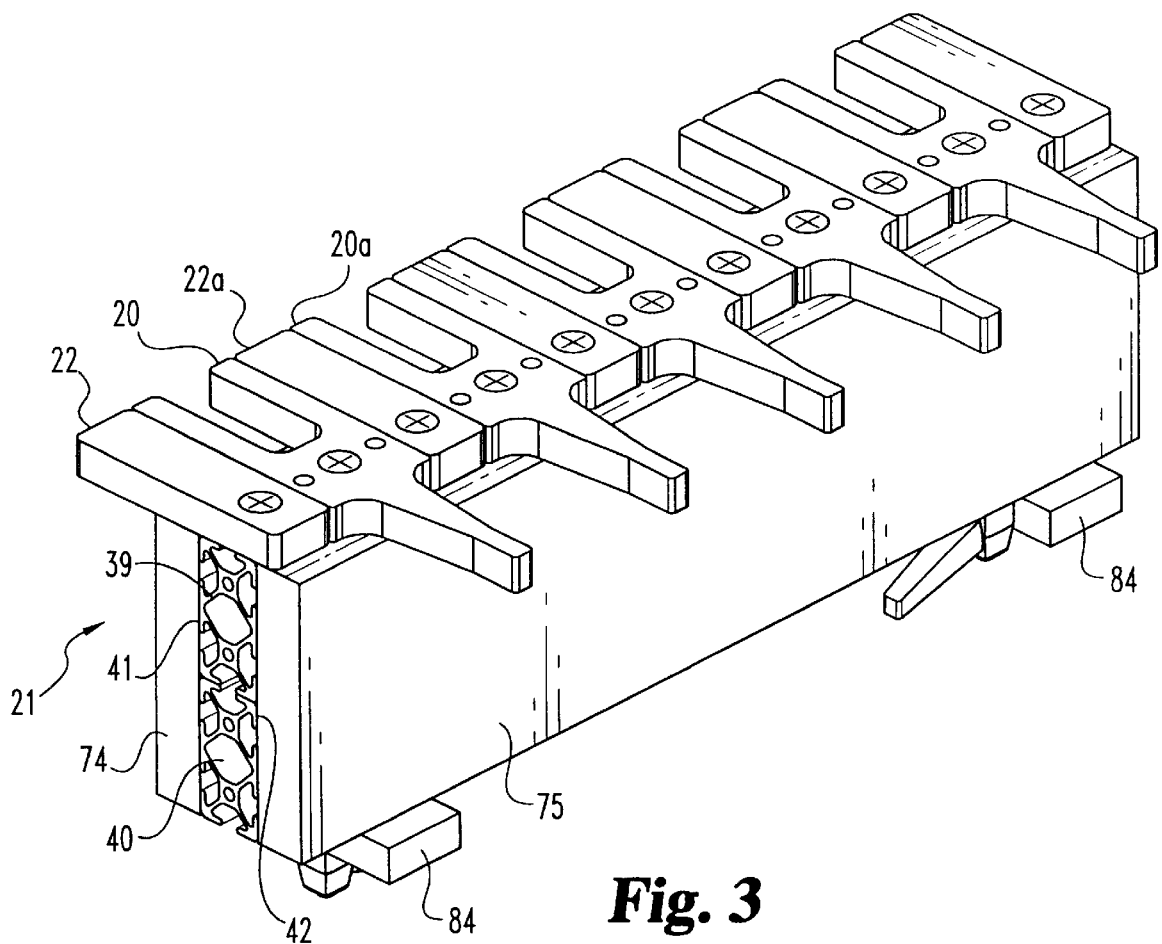
FIG. 3 is a perspective view of a tooling fixture which receives and supports at least one FIG. 1 dovetail joint jig.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1 and 2, a dovetail joint jig 20 which is designed according to the present invention is illustrated. The dovetail joint jig 20, or guide finger as it is also called, is a machining template for use as part of a larger tooling fixture for creating a dovetail slot in one workpiece and a "matching" dovetail pin in another workpiece. The intent is for the two workpieces to interfit or interlock together along abutting corner edges with a secure and closely toleranced dovetail joint. If the interfit of one pin into a matching slot constitutes a "joint", then the typical assembly of the two workpieces is by means of a series or plurality of joints as would typically be found in wooden furniture and in particular in the corners of drawers. The dovetail joint(s) to be created by use of guide finger 20 are suitable for jointing two wooden members together such as at the corner of a drawer, bed frame, or chest, for example.

While guide finger 20 is designed to enable the creation of a dovetail slot and a matching dovetail pin, a plurality of guide fingers are typically used so as to provide several pin-slot combinations along the abutting edges of the two workpieces. As should be understood, the specific size and shape of the various guide fingers which are arranged in combination so as to create a fixture or template may be the same or may be different, without affecting either the tightness of the fit or the accuracy of each joint location. As will be made clear, once the workpieces are aligned and properly positioned on the tooling fixture, the centerline spacing for each part of each joint and the joint-to-joint spacing is fixed once the guide fingers are selected and attached to the tooling fixture 21 (see FIGS. 3–5). Spacers 22 are provided in order to vary and control the spacing between adjacent guide fingers 20.

Each guide finger 20 includes a slot portion 25 at one end and a pin portion 26 at the opposite end. Slot portion 25 is arranged with two spaced-apart projections 27 and 28 which define the sides of opening 29. The base 30 of opening 29 is defined by main body 31. Slot portion 25 is symmetrical, side-to-side, relative to longitudinal centerline 32. As illustrated in FIG. 2, the entirety of guide finger 20 has a uniform thickness. Further, top surface 36 and bottom surface 37 are each substantially flat and smooth and are substantially parallel to each other. It is also important that each guide finger 20 and each spacer 22 which is assembled to the tooling fixture 21 have the same thickness. In this way there will be a smooth and substantially flat support surface for the router to move across as the router bit traces the exposed edges of each guide finger 20.

Referring now to FIGS. 3–7, the tooling fixture 21 is illustrated in greater detail. While a variety of construction techniques can be used to create fixture 21, the design of the present invention is particularly well suited in that it offers strength, stability, and design versatility. Fixture 21 includes a pair of aluminum support bars 39 and 40 which are securely joined together by threaded fasteners. Alternatively, a single-piece support may be used or the two bars may be joined by press-fit pins or welds. The rectangular block which is created includes a plurality of tapped holes suitable for receiving threaded fasteners. In the assembled condition sides 41 and 42 are substantially flat and substantially parallel to each other. Top and bottom surfaces 43 and 44, respectively, are also substantially flat and substantially parallel to each other. Further, sides 41 and 42 are substantially perpendicular to surfaces 43 and 44. The opposite end of support bar 39 is positioned flush with the adjacent end of support bar 40.

Support bar 39 is designed with an upwardly opening channel 52 having tapered sides 53 and 54 and enclosing flanges 55 and 56 which define entrance 57. The same construction is present on the bottom surface 44 of support bar 40 where channel 58 is located. Channel 52 is used for the alignment and attachment of the individual guide fingers 20 and the separating and alternating spacers 22. By the use of a two-part headed fastener 61 (see FIGS. 5 and 7) and guide rivets, each guide finger is anchored to top surface 43. The specific design of fastener 61 includes an enlarged portion (not illustrated) which fits closely within channel 52 and is unable to turn or rotate, but is able to slide along the length of channel 52. The internally-threaded shaft extends upwardly through entrance 57. The head of countersunk Allen screw 64 is received by the countersunk hole 65 in each guide finger 20 and spacer 22. The threads of screw 64 are received by the internally-threaded shaft. As will be understood, as screw 64 is turned by an Allen wrench, the two parts of fastener 61 draw together and the bottom surface 37 of guide finger 20 is drawn tight against top surface 43. The same assembly and attachment scheme is used for each guide finger 20 and for each spacer 22.

With further reference to FIG. 1, each guide finger 20 also includes two alignment pin holes 68 and 69 which are on the same transverse centerline 70 as the countersunk hole 65.

Guide pins 71 and 72 are press fit into holes 68 and 69, respectively. Pins 71 and 72 have an outside diameter which is virtually the same dimension as the width of entrance 57, though there is a very slight clearance. In this way the "squareness" of each guide finger can be assured. Centerline 32 and centerline 70 are substantially perpendicular to each other and centerline 70 is substantially parallel to sides 41 and 42. If only countersunk hole 65 was provided, the guide finger 20 could rotate relative to support bar 39. By the use of the two alignment/guide pins 71 and 72, the centerline 32 is assured of being substantially perpendicular to sides 41 and 42. The importance of this relationship should be appreciated, but will be described in greater detail hereinafter.

With continued reference to FIGS. 3–7, fixture 21 includes two virtually identical back-up boards 74 and 75, each of which are designed with flat, substantially parallel sides 76 and 77 and a smooth and flat-sided rectangular periphery 78. The top surface of periphery 78 of each board is flush with top surface 43. The exposed sides 76 of each board 74 and 75 are substantially parallel to each other and provide the mounting surfaces for the two workpieces. Clearance holes 79 and 80 which are disposed in each back-up board are used to attach each board to the corresponding sides 41 and 42 of the support bar assembly (i.e., the assembled combination of support bars 39 and 40). Headed fasteners similar to fastener 61 are used for the attachment of the back-up boards to the support bar assembly.

Figure 4:
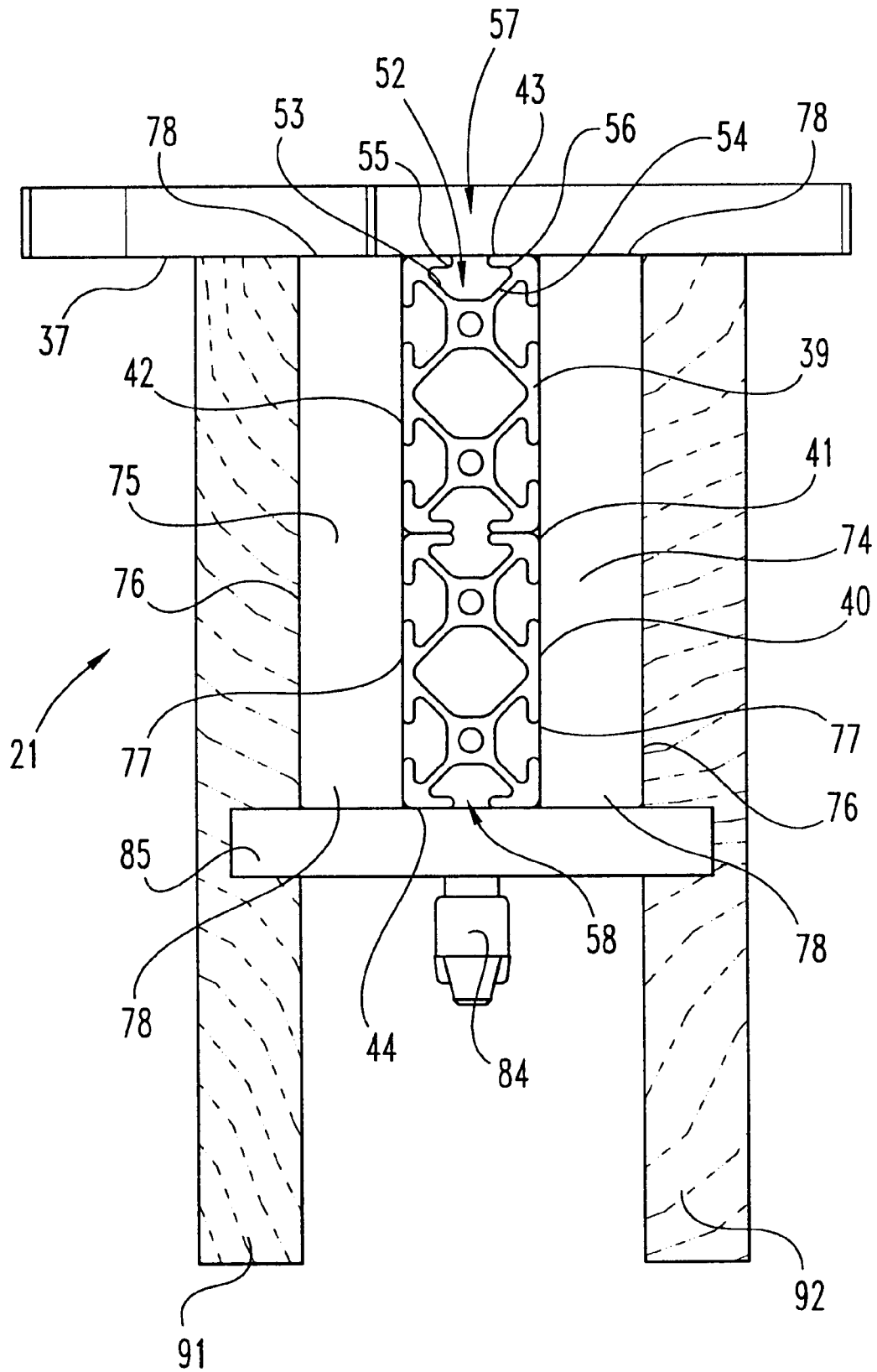
FIG. 4 is a side elevational view of the FIG. 3 tooling fixture with workpieces added.
Figure 5:
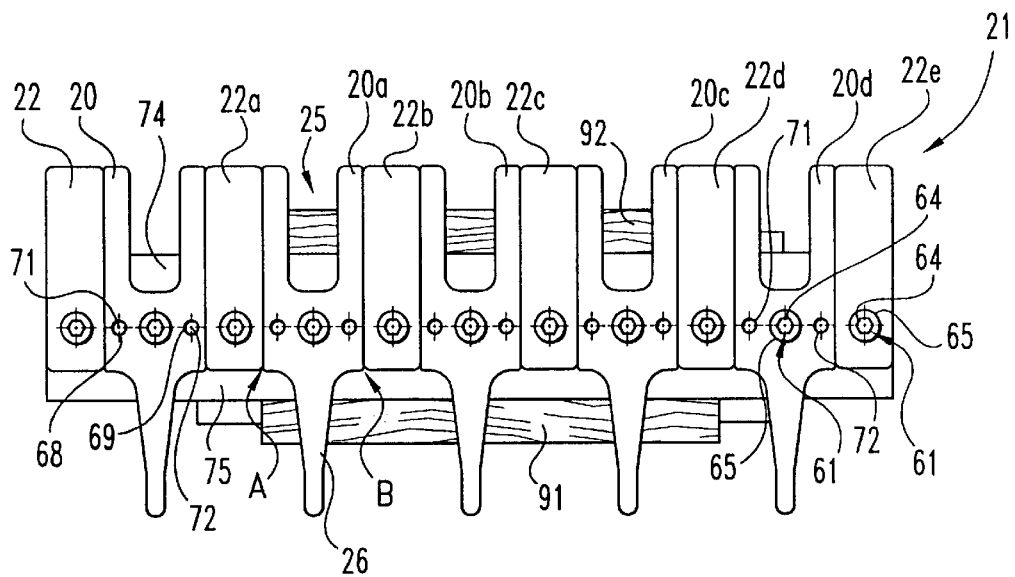
FIG. 5 is a top plan view of the FIG. 3 tooling fixture with workpieces attached.
Figure 6:
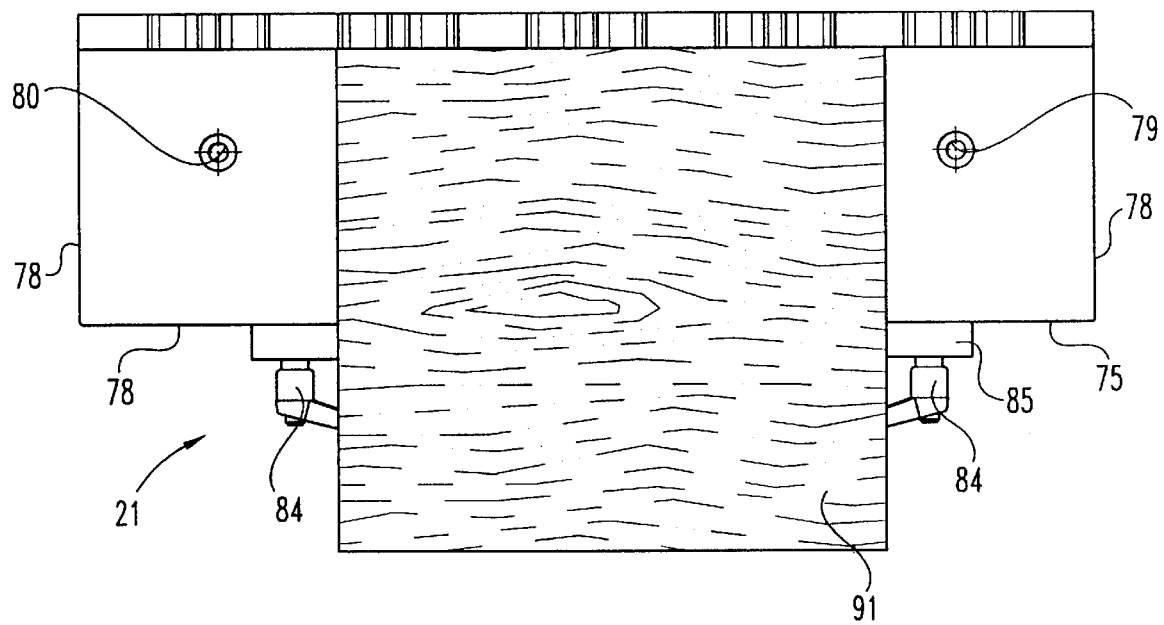
FIG. 6 is an enlarged front elevational view of the FIG. 5 assembly.
Figure 20:
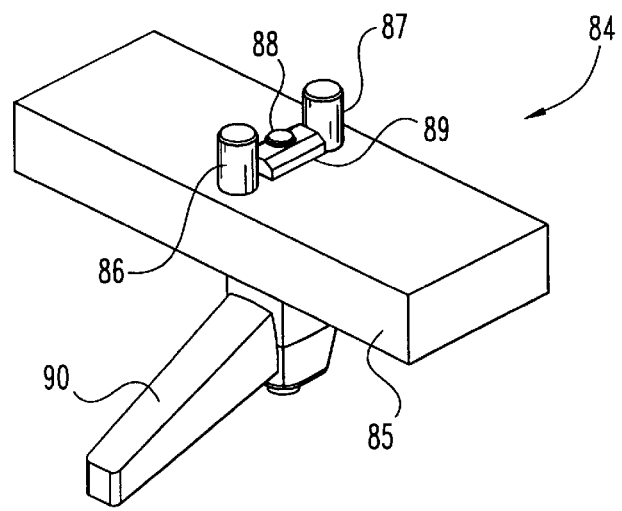
FIG. 20 is a perspective view of one clamp assembly which comprises a portion of the present invention.

As illustrated in FIGS. 4, 6, and 7, the bottom channel 58 is used to receive a pair of clamp assemblies 84. Each clamp assembly (see FIG. 20) includes a clamp plate 85, alignment pins 86 and 87, threaded fastener 88, guide block 89, and handle 90. The handle controls the threaded fastener which threads into the guide block. The clearance hole for the threaded fastener is on the same centerline as the two pins which are pressed into plate 85. As should be understood, block 89 slides into channel 58 and the alignment pins are positioned in the entrance slot to channel 58. As the handle is turned in a clockwise direction, the plate 85 is drawn tight against bottom surface 44. Turning the handle 90 in a counterclock-wise direction loosens the fit. As is illustrated in FIG. 4, the two plates 85 are used to position and align the reference edges of workpieces 91 and 92 relative to each so that the machined joints are aligned. Assuming that the guide fingers 20 and spacers 22 are already assembled, the workpieces are positioned in the required location on the fixture in order to establish the designed joint locations relative to the reference edges of the workpieces. The guide fingers and spacers can be shifted in order to adjust the joint locations relative to the reference edges, if desired. The clamp assemblies serve the purpose of edge alignment for the two workpieces. The workpieces are then securely clamped in their desired location up against the back-up boards 74 and 75 by the use of a woodworking clamp (not illustrated). The size of the guide fingers 20 relative to tooling fixture 21 and workpieces 91 and 92 is such that the slot portion 25 of each guide finger 20 overhangs workpiece 92. The pin portion 26 of each guide finger 20 overhangs workpiece 91. The workpieces 91 and 92 are illustrated in FIGS. 4, 5, and 6.

Once the fixture 21 is assembled, and once the selected guide fingers and alternating spacers are arranged and secured in position, and after the workpieces are clamped in place, it is time to operate the router and create a series of dovetail pins in workpiece 91 and a matching and cooperating series of dovetail slots in workpiece 92. With reference to FIG. 5, five guide fingers 20, 20a, 20b, 20c, and 20d are used and are separated by six identical spacers 22, 22a, 22b, 22c, 22d, and 22e. It will be understood that any pin which is created from one of the guide fingers is centered on the same centerline as the slot which is created in the other workpiece from that same guide finger. So long as the edges of the two workpieces 91 and 92 are aligned flush with each other, as achieved by means of the two clamp assemblies 84, the centerline of the pin from the edge of one workpiece will be identical to the centerline of the slot from the edge of the other workpiece. Consequently, when the pin and slot are mated, the ends of the two workpieces, such as an upper edge of a drawer, will be virtually flush with one another, requiring a minimum of planing or sanding. The centerline alignment of each pin and its corresponding slot for each guide finger guarantees that the pin-to-slot fit will be precise, regardless of the number or style of spacers which are used and regardless of the number or style of other guide fingers. As illustrated, the workpieces can, but need not, extend the entire length of the fixture 21. The router simply traces those guide fingers which extend over the workpieces.

Figure 10:
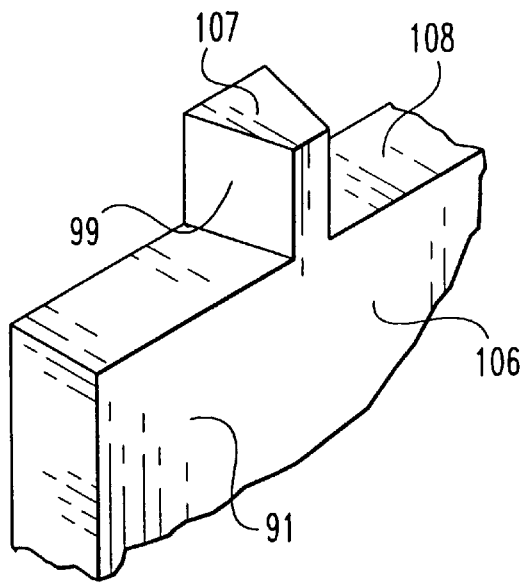
FIG. 10 is a partial perspective view of a first workpiece with a dovetail joint pin machined therein.

In order to create the pins in workpiece 91, material needs to be removed. A cylindrical router bit 96 (see FIG. 8) is used and the peripheral edges of the pin portion 26 of each guide finger is traced. The router bit is guided by bearing 97 rolling across the periphery of the guide finger from point A to point B as marked in FIG. 5. Actually all of the "excess" material is to be removed on either side of the pin portion 26. This leaves the material of the workpiece which is directly beneath tapered portion 98 and this is how the pin 99 (see FIG. 10) is created. As would be clear to a person of ordinary skill in the art, the pin 99 which is left after machining around the pin portion 26 of guide finger 20 has a dovetail (tapered) shape due to the tapered shape of pin portion 26. The machined sides of pin 99 are straight and flat due to the use of a cylindrical router bit 96.

Figure 11:
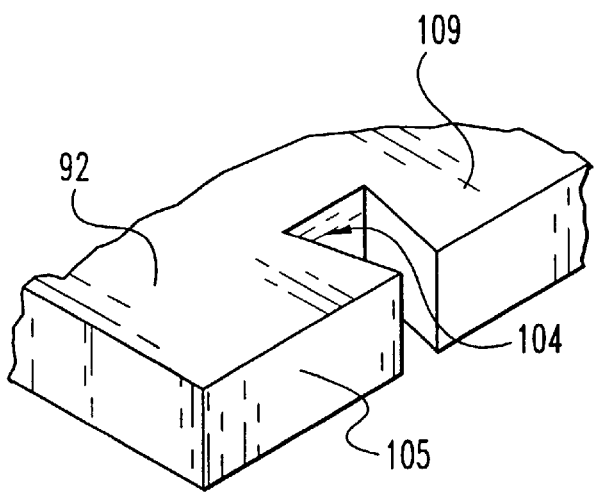
FIG. 11 is a partial perspective view of a second workpiece with a dovetail joint slot machined therein.

In order to create the matching dovetail slot in workpiece 92, material must be removed. Further, the shape of the slot needs to match the shape of the pin. In order to do so, a tapered router bit 102 (see FIG. 9) is used. As the bearing 103 traces along the slot edges of slot portion 25, material is removed in the shape of a tapered slot (see FIG. 11). The slot 104 which is created from tapered router bit 102 has a geometry as far as its size and shape of the tapered sides which matches the geometry of the tapered sides of pin 99. As would be understood by a person of ordinary skill in the art, once the machined edges of the two workpieces are turned 90 degrees to each other, the tapered dovetail pin 99 fits snugly into the tapered dovetail slot 104. This assembly relationship holds true regardless of the number, size, style, or spacing of the various guide fingers and spacers.

Two important aspects of the present invention are the centerline alignment of slot 29 and tapered portion 98 and the use of a tapered router bit wherein the shape of the taper on the router bit is the same as the shape of the taper of portion 98. Centerline 32 extends longitudinally through guide finger 20 and the guide finger is constructed and arranged so as to be symmetrical on opposite sides of centerline 32.

In order to establish a precise fit between the dovetail slot 104 and pin 99, these two features each need to have a corresponding taper. This cooperating relationship is established by using a tapered router bit 102 which has a shape which is virtually identical to the tapered shape of portion 98 on each guide finger 20. Another relationship to address is the depth of the router bit cut into workpiece 92 in order to create slot 104. It is preferable for the depth of cut in the workpiece 92 to be at least equal to the thickness of workpiece 91. Whenever the depth of cut is greater, excess material on the end 105 of workpiece 92 will need to be removed so that end 105 is flush with surface 106. Likewise, the depth of cut into workpiece 91 establishes the length of each pin which is the distance from surface 107 to surface 108. Whenever the length of the pin exceeds the thickness of workpiece 92, the excess material on end surface 107 should be removed so that surface 107 is flush with surface 109.

The individualized nature of each guide finger 20 is important because it allows differently styled guide fingers to be used as part of the same joint corner. The individualized design of each guide finger also enables the spacing between adjacent guide fingers to be changed and varied within the same dovetail corner. So long as the workpiece ends are positioned on tooling fixture 21 in a generally flush manner, a near perfect alignment and fit is guaranteed. Even if the workpieces are not initially set flush, this only means a subsequent sanding or planing step to establish generally planar top and bottom surfaces for the jointed workpieces. As the pin and slot which are machined from the first guide finger are mated together, all other pins and slots from whatever other guide fingers are assembled to fixture 21 automatically become mated into a dovetail corner joint. Final "machining" (i.e., sanding and/or planing) is performed to create flush surfaces, both on the sides of the two workpieces as well as on tops and bottoms. This is what would be expected for a dovetail joint on the corner of a drawer, for example.

Referring now to FIGS. 12–18, seven differently styled guide fingers are illustrated. Each of these different guide fingers represents variations as to size and/or shape of the pins and slots which would be created according to the present invention. Consistent with the teachings of the present invention, each of the illustrated guide fingers is symmetrical about its corresponding longitudinal centerline and each generally coincides with the design of guide finger 20. The top and bottom surfaces of each guide finger of FIGS. 12–18 are substantially flat and substantially parallel to each other. With a uniform thickness, virtually any combination of guide fingers can be created and assembled onto tooling fixture 21. However, due to the style of the guide fingers in FIGS. 12, 13, and 14 and the location of the datum reference lines, the guide fingers of these three figures can only be mixed with each other. The only other precautionary note is that the router bits may need to be changed from one guide finger to the next guide finger on the slot portion side of fixture 21.

Figure 12:
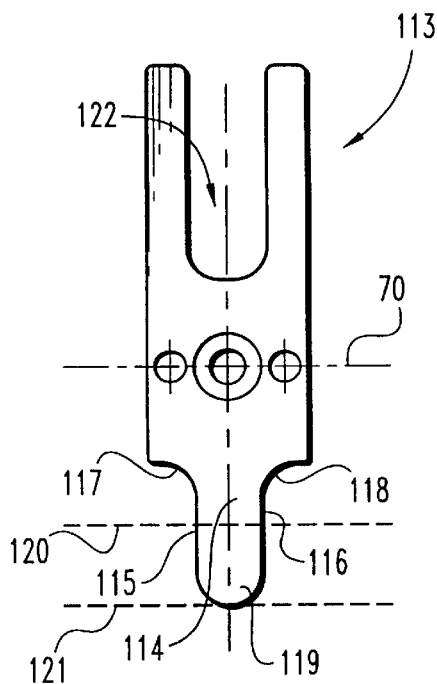
FIG. 12 is a top plan view of a half-round box joint jig according to another embodiment of the present invention.

Referring to FIG. 12, guide finger 113 has a pin portion 114 with straight sides 115 and 116, radiused corners 117 and 118, and a radiused end 119. The portion which defines the shape of the pin in the corresponding workpiece is bounded by broken lines 120 and 121 which represent two critical datum reference lines. In order to establish the necessary compatibility for the resultant woodworking joint, the router bit which is used in slot portion 122 needs to have a matching cross section shape.

Figure 13:
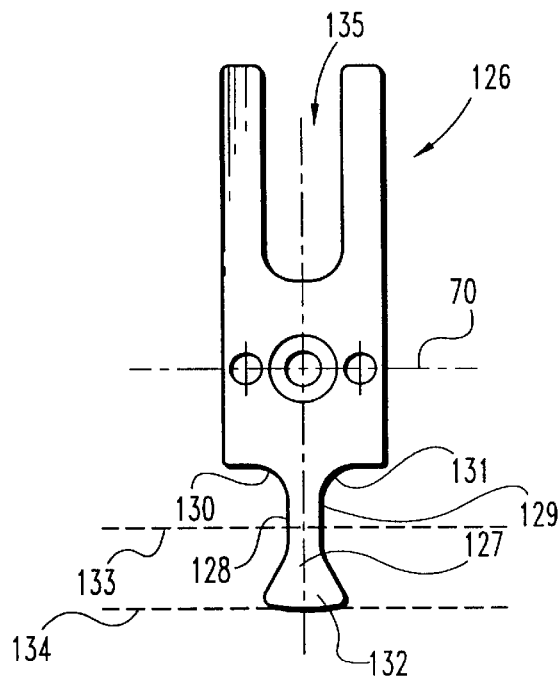
FIG. 13 is a top plan view of a rounded joint jig according to another embodiment of the present invention.

Referring to FIG. 13, guide finger 126 has a pin portion 127 with straight sides 128 and 129, radiused corners 130 and 131, and a dovetail end 132. The portion which defines the shape of the pin in the corresponding workpiece is bounded by broken lines 133 and 134. In order to establish the necessary compatibility for the resultant dovetail joint, the router bit which is used in slot portion 135 needs to have a matching cross section shape.

Figure 14:
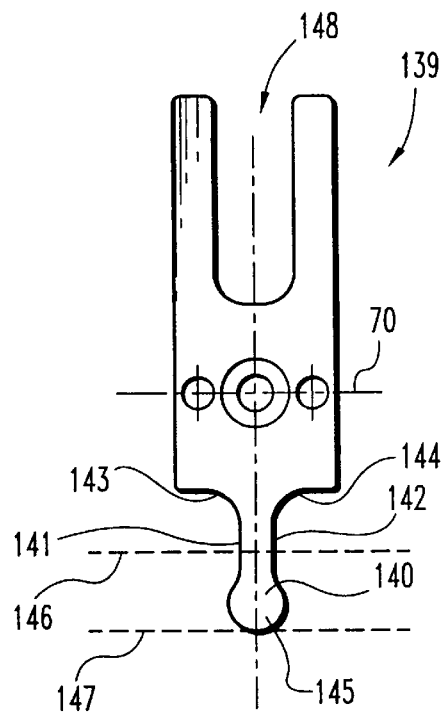
FIG. 14 is a top plan view of a bulb joint jig according to another embodiment of the present invention.

Referring to FIG. 14, guide finger 139 has a pin portion 140 with straight sides 141 and 142, radiused corners 143 and 144, and a near-circular end 145. The portion which defines the shape of the pin in the corresponding workpiece is bounded by broken lines 146 and 147. In order to establish the necessary compatibility for the resultant dovetail joint, the router bit which is used in slot portion 148 needs to have a matching cross section shape.

Figure 15:
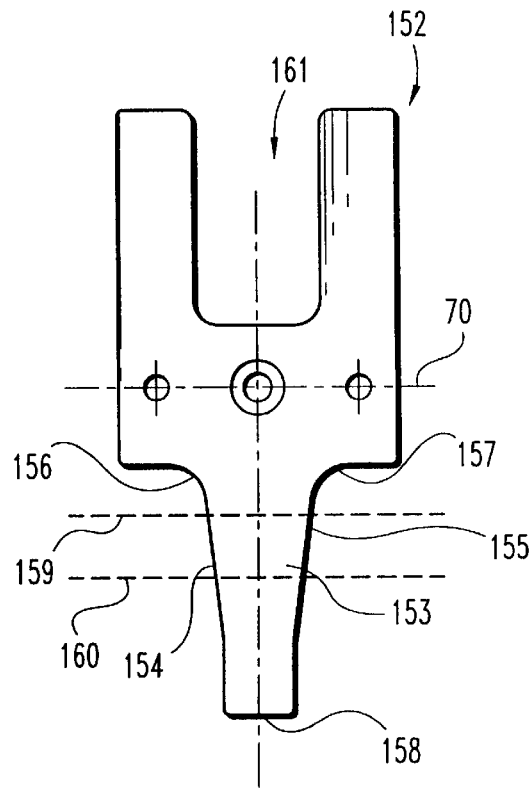
FIG. 15 is a top plan view of a dovetail joint jig according to another embodiment of the present invention.

Referring to FIG. 15, guide finger 152 has a pin portion 153 with tapering sides 154 and 155, radiused corners 156 and 157, and a squared-off end 158. The portion which defines the shape of the pin in the corresponding workpiece is bounded by broken lines 159 and 160. In order to establish the necessary compatibility for the resultant dovetail joint, the router bit which is used in slot portion 161 needs to have a corresponding taper, though may have a smaller cross-sectional width since the router bit can be moved back and forth in slot portion 161.

Figure 16:
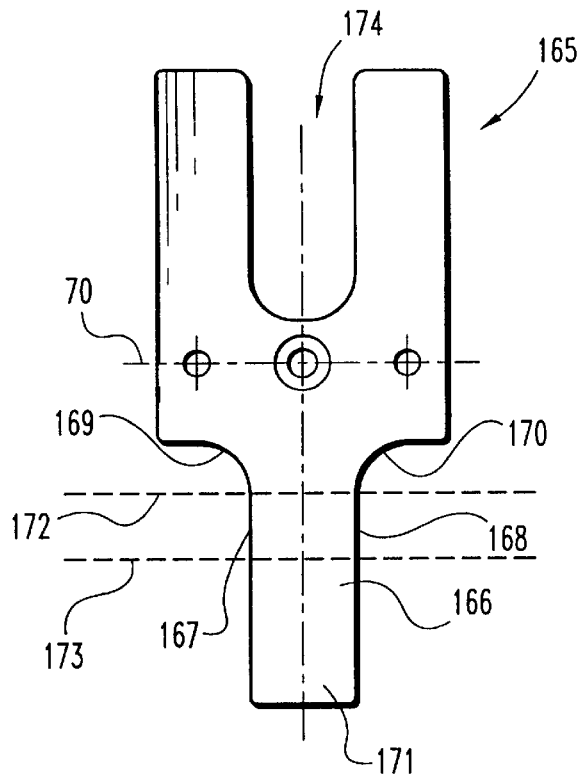
FIG. 16 is a top plan view of a box joint jig according to another embodiment of the present invention.

Referring to FIG. 16, guide finger 165 has a pin portion 166 with straight sides 167 and 168, radiused corners 169 and 170, and a flat end 171. The portion which defines the shape of the pin in the corresponding workpiece is bounded by broken lines 172 and 173. In order to establish the necessary compatibility for the resultant dovetail joint, the router bit which is used in slot portion 174 needs to have a corresponding cylindrical shape, like the router bit of FIG. 8. The selected router bit must have a diameter which is able to fit in the corresponding slot.

Figure 17:
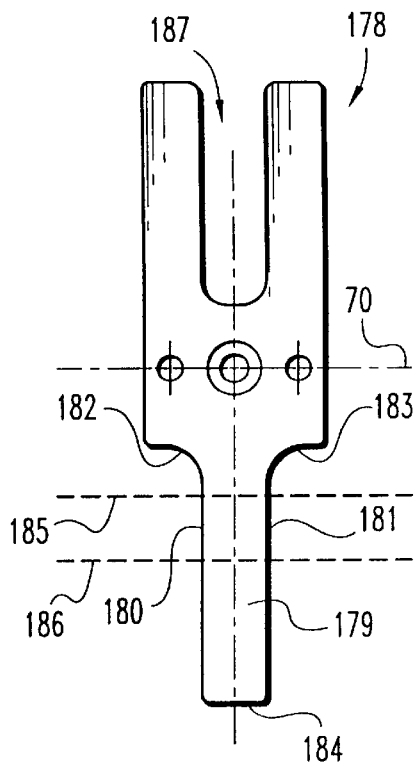
FIG. 17 is a top plan view of a box joint jig according to another embodiment of the present invention.

Referring to FIG. 17, guide finger 178 has a pin portion 179 with straight sides 180 and 181, radiused corners 182 and 183, and a flat end 184. The portion which defines the shape of the pin in the corresponding workpiece is bounded by broken lines 185 and 186. In order to establish the necessary compatibility for the resultant dovetail joint, the router bit which is used in slot portion 187 needs to have a corresponding cylindrical shape, like the router bit of FIG. 8. The selected router bit must have a diameter which is able to fit in the corresponding slot.

Figure 18:
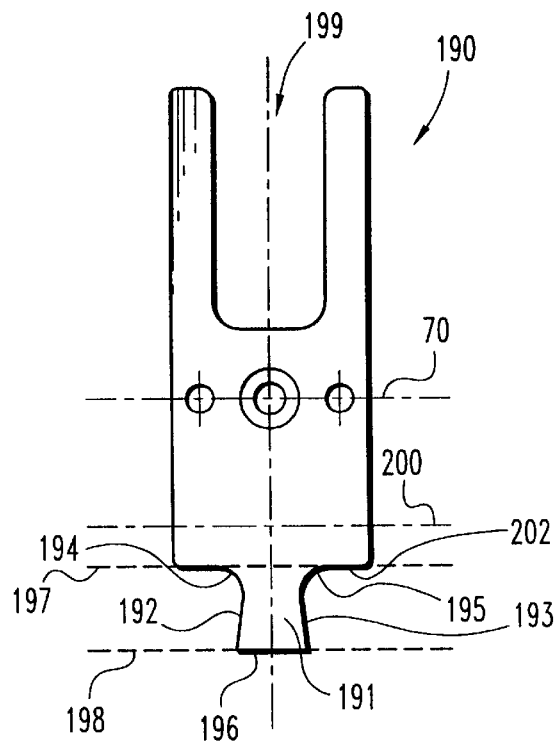
FIG. 18 is a top plan view of a half-blind joint jig according to another embodiment of the present invention.

Referring to FIG. 18, guide finger 190 has a pin portion 191 with diverging sides 192 and 193, radiused corners 194 and 195, and a flat end 196. The portion which defines the shape of the pin in the corresponding workpiece is bounded by broken lines 197 and 198. In order to establish the necessary compatibility for the resultant half-blind joint, the router bit which is used in slot portion 199 needs to have a shape which approximates the shape of the pin portion 191. The workpiece location is defined by broken lines 200 and 198. Due to the fact that line 200 is located within the body of the guide finger, interior to edge 202, the resultant woodworking joint will be a half-blind interlocking joint. Similarly, broken line 197 which is part of the defining geometry for the pin is positioned between broken lines 198 and 200 which define the outer surfaces of the corresponding workpiece. While the corresponding router bit geometry in cross-sectional shape will be identical to pin portion 191, the shape of the router bit must also include the two inside radiused corners 194 and 195.

Figure 19:
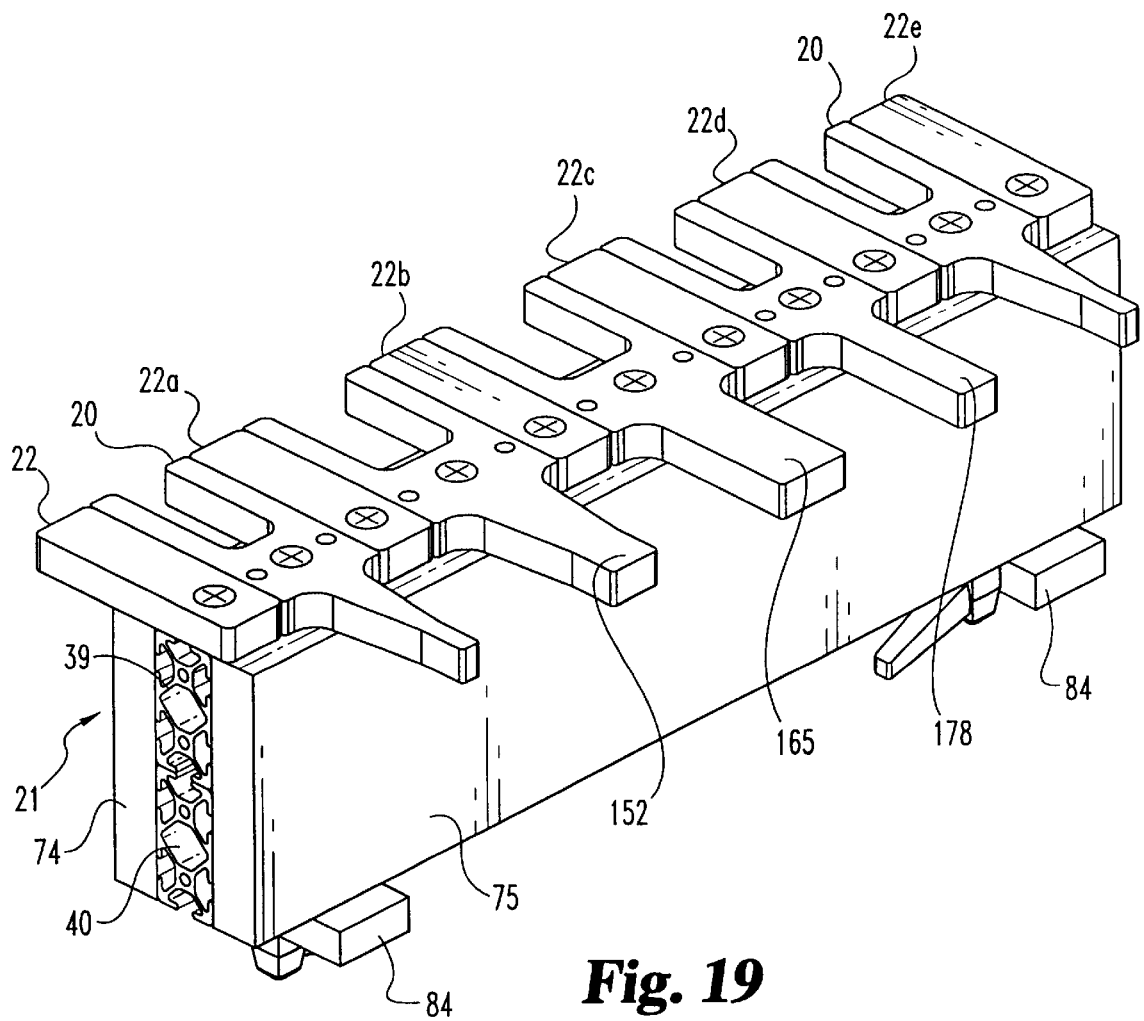
FIG. 19 is a top plan view of a tooling fixture arranged with a variety of dovetail joint jigs according to the present invention.

As indicated, each guide finger establishes the pin and slot for one dovetail joint. By means of tooling fixture 21 a plurality of guide fingers can be arranged for creating a series of dovetail joints in two workpieces which are intended to be joined together. In FIG. 5 it is intended that all of the guide fingers 20–20d be of the same size and shape and positioned with uniform spacing between adjacent guide fingers. This arrangement produces a corner joint with a uniformly-spaced series of individual dovetail joints which are all of substantially the same size and shape. In FIG. 19, a variety of different guide fingers are arranged on fixture 21 as a way to illustrate the versatility of the present invention.

Since each guide finger establishes its own pin and slot combination centerline for an accurate dovetail fit, virtually any combination of guide fingers is possible. Due to the difference in datum reference line locations for the guide fingers illustrated in FIGS. 12, 13, and 14, it should be noted that any mixture or combination of different guide fingers must be based on datum reference line compatibility. Consequently, the style of guide fingers illustrated in FIGS. 12–14 can only be combined with one another. While the remaining guide fingers can also be combined with one another, it would not be appropriate to try and mix any of the guide fingers illustrated in FIGS. 15–17 with any of the guide fingers illustrated in FIGS. 12–14.

As mentioned, if the shape of the pin portion necessitates a router bit shape which is something other than the tapered design of route bit 102, then it is conceivable that when machining away the workpiece material which is exposed in the opening of the slot portion, the specific router bit will need to be changed when moving guide finger to guide finger. In other words, the shape of the finger portion which extends over the end of the workpiece, such as workpiece 91 (i.e., tapered portion 98) dictates and establishes the shape of the router bit which is run in the corresponding slot portion of that particular guide finger in order to remove material from the other workpiece 92 so that there will be snug fit of the pin in the corresponding slot.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
    a first cutting bit for coupling to and for use with a machining implement, said first cutting bit having a cross section shape defined by a predetermined outer edge contour;
    a second cutting bit for coupling to and for use with said machining implement; and
    a unitary tooling jig for guiding the combination of said machining implement and said first cutting bit for creating a portion of a female slot in a first workpiece and for guiding the combination of said machining implement and said second cutting bit for creating a portion of a cooperating male pin in a second workpiece for ultimately jointing together said first and said second workpieces, said tooling jig comprising:
        a main body portion;
        a first end portion positioned on one side of said main body portion and including a guiding portion with an edge contour for the combination of said machining implement and said second cutting bit to follow as part of creating the portion of said cooperating male pin; and
        a second end portion positioned on an opposite side of said main body portion in relation to said first end portion, said second end portion including a guiding edge for the combination of said machining implement and said first cutting bit to follow as part of creating the portion of said female slot, wherein the edge contour of the guiding portion of said first end portion has an edge geometry which substantially coincides with the predetermined outer edge contour of said first cutting bit.

2. The combination of claim 1 wherein said guiding portion includes a curved section.

3. The combination of claim 2 wherein said curved section has a concave curvature.

4. The combination of claim 2 wherein said curved section has a convex curvature.

5. The combination of claim 1 wherein said guiding portion includes a linear section and a curved section.

6. The combination of claim 1 wherein said guiding portion includes a first linear section and a second linear section which defines an included angle in combination with said first linear section.

7. The combination of claim 6 wherein said guiding portion further includes a curved section adjacent said first linear section.

8. A dovetail joint jig for guiding a power tool for creating a dovetail slot in a first workpiece and a dovetail pin in a second workpiece, said dovetail joint jig comprising:
    a main body portion;
    a slot portion on one side of said main body portion;
    a pin portion on an opposite side of said main body portion;
    said slot portion including a pair of oppositely-disposed side projections which define a clearance space;
    said pin portion including a slot-shaped portion whose planar shape corresponds with the shape of the slot to be created in said first workpiece; and
    said dovetail joint jig being constructed and arranged with a longitudinal centerline wherein said clearance space and said slot-shaped portion are each constructed and arranged so as to be symmetrical about said longitudinal centerline, wherein said first workpiece is positioned relative to said dovetail joint jig such that an end of said first workpiece is visible through said clearance space and wherein said second workpiece is positioned relative to said dovetail joint jig such that an end of said second workpiece is disposed beneath said slot-shaped portion.

9. The dovetail joint jig of claim 8 wherein said dovetail joint jig is a unitary member and includes a substantially flat upper surface and a substantially flat lower surface, said upper surface and said lower surface being substantially parallel to each other.

10. The dovetail joint-jig of claim 8 wherein said slot-shaped portion has a tapered planar shape.

11. The dovetail joint jig of claim 8 wherein said main body portion includes a clearance hole for attaching said dovetail joint jig to a support fixture.

12. The dovetail joint jig of claim 8 wherein each side projection includes an inner, clearance space-facing surface, said surfaces being substantially parallel to each other.

13. A tooling jig for guiding a machining implement for creating a female portion in a first workpiece and a cooperating male portion in a second workpiece for jointing together said fist and second workpieces, said tooling jig comprising:
    a main body portion;
    a first end portion on one side of said main body portion;
    a second end portion on an opposite side of said main body portion;
    said first end portion including a pair of spaced-apart arms which define a clearance slot;
    said second end portion including a projecting portion with a section whose planar shape coincides with the shape of the female portion to be created in said first workpiece; and said tooling jig having a longitudinal centerline and said clearance slot and said projecting portion section each being construed and arranged to be symmetrical about said longitudinal centerline, wherein said first workpiece is positioned relative to said tooling jig such that an end of said first workpiece is visible through said clearance slot and wherein said second workpiece is positioned relative to said tooling jig such that an end of said second workpiece is disposed beneath said projecting portion section.

14. The tooling jig of claim 13 wherein said tooling jig is a unitary member and includes a substantially flat upper surface and a substantially flat lower surface, said upper surface and said lower surface being substantially parallel to each other.

15. The tooling jig of claim 14 wherein said main body portion includes a clearance hole for attaching said tooling jig to a support fixture.

16. The tooling jig of claim 13 wherein said main body portion includes a clearance hole for attaching said tooling jig to a support fixture.

17. A tooling fixture for use in combination with a tooling jig for creating a dovetail slot in a first workpiece and a cooperating dovetail pin in a second workpiece, said tooling fixture comprising:
   a support frame having a substantially flat top surface and including a support member and a pair of oppositely-disposed back-up panels attached to opposite sides of said support member; and
   a clamp assembled to said support member and being movable relative to said support member for alignment of said first and second workpieces.

18. The tooling fixture of claim 17 wherein said support member defines a first channel for receipt of a hardware component used to attach said tooling jig to said support member.

19. The tooling fixture of claim 18 wherein said first channel opens upwardly in the direction of said top surface.

20. The tooling fixture of claim 19 wherein said support member defines a second channel for receipt of a hardware component for assembly of said clamp to said support member.

21. In combination:
   a first cutting bit for coupling to and for use with a machining implement, said first cutting bit having a cross section shape defined by a predetermined outer edge contour;
   a second cutting bit for coupling to and for use with said machining implement; and
   a tooling jig for guiding the combination of said machining implement and said first cutting bit for creating a portion of a female slot in a first workpiece and for guiding the combination of said machining implement and said second cutting bit for creating a portion of a cooperating male pin in a second workpiece for ultimately jointing together said first and said second workpieces, said tooling jig comprising:
      a main body portion;
      a first end portion positioned on one side of said main body portion and including a guiding portion with an edge contour for the combination of said machining implement and said second cutting bit to follow as part of creating the portion of said cooperating male pin, said guiding portion includes a curved section; and
      a second end portion positioned on an opposite side of said main body portion in relation to said first end portion, said second end portion including a guiding edge for the combination of said machining implement and said first cutting bit to follow as part of creating the portion of said female slot, wherein the edge contour of the guiding portion of said first end portion has an edge geometry which substantially coincides with the predetermined outer edge contour of said first cutting bit.

22. The combination of claim 21 wherein said curved section has a concave curvature.

23. The combination of claim 21 wherein said curved section has a convex curvature.

24. The combination of claim 21 wherein said guiding portion further includes a linear section.

25. In combination:
   a first cutting bit for coupling to and for use with a machining implement, said first cutting bit having a cross section shape defined by a predetermined outer edge contour;
   a second cutting bit for coupling to and for use with said machining implement; and
   a tooling jig for guiding the combination of said machining implement and said first cutting bit for creating a portion of a female slot in a first workpiece and for guiding the combination of said machining implement and said second cutting bit for creating a portion of a cooperating male pin in a second workpiece for ultimately jointing together said first and said second workpieces, said tooling jig comprising:
      a main body portion;
      a first end portion positioned on one side of said main body portion and including a guiding portion with an edge contour for the combination of said machining implement and said second cutting bit to follow as part of creating the portion of said cooperating male pin, said guiding portion includes a defining surface section which is constructed and arranged for positioning between first and second outer surfaces of said second workpiece; and
      a second end portion positioned on an opposite side of said main body portion in relation to said first end portion, said second end portion including a guiding edge for the combination of said machining implement and said first cutting bit to follow as part of creating the portion of said female slot, wherein the edge contour of the guiding portion of said first end portion has an edge geometry which substantially coincides with the predetermined outer edge contour of said first cutting bit.

26. The combination of claim 25 wherein said tooling jig is a unitary member.

* * * * *

UNITED STATES PATENT AND TRADEMARK OFFICE
CERTIFICATE OF CORRECTION

PATENT NO : 6,116,303

DATED : September 12, 2000

INVENTOR(S) : R. Terry Hampton

It is certified that an error appears in the above-identified patent and that said Letters Patent are hereby corrected as shown below:

In Col. 11, at line 3, please change "construed" to -- constructed --.

Signed and Sealed this

First Day of May, 2001

Attest:

NICHOLAS P. GODICI

*Attesting Officer*     *Acting Director of the United States Patent and Trademark Office*